M. M. BORDEN.
LOSS OF HEAD AND RATE OF FLOW GAGE.
APPLICATION FILED AUG. 31, 1907.

926,721.

Patented July 6, 1909.
2 SHEETS—SHEET 2.

WITNESSES:
Jos. G. Denny Jr.
Robt P Kitchel

INVENTOR
Moro M. Borden
BY
Chas. N. Butler
ATTORNEY.

UNITED STATES PATENT OFFICE.

MORO M. BORDEN, OF COLLINGSWOOD, NEW JERSEY, ASSIGNOR TO SIMPLEX VALVE & METER COMPANY, OF CAMDEN, NEW JERSEY, A CORPORATION OF NEW JERSEY.

LOSS-OF-HEAD AND RATE-OF-FLOW GAGE.

No. 926,721.        Specification of Letters Patent.        Patented July 6, 1909.

Application filed August 31, 1907. Serial No. 390,862.

*To all whom it may concern:*

Be it known that I, MORO M. BORDEN, a citizen of the United States, residing at Collingswood, in the county of Camden and State of New Jersey, have invented a Loss-of-Head and Rate-of-Flow Gage, of which the following is a specification.

This invention is a gage for indicating the variation of head and rate of flow of liquids generally. In its present application it is used in connection with a filter where it is desirable to have indicated the loss of head and rate of flow, which vary through varying conditions in the filter bed. In its preferred form means are provided whereby piezometric columns communicate the different pressures which determine the loss of head and rate of flow to differential mechanisms comprising revoluble and longitudinally movable shafts through which indicating devices are operated.

Figure 1:
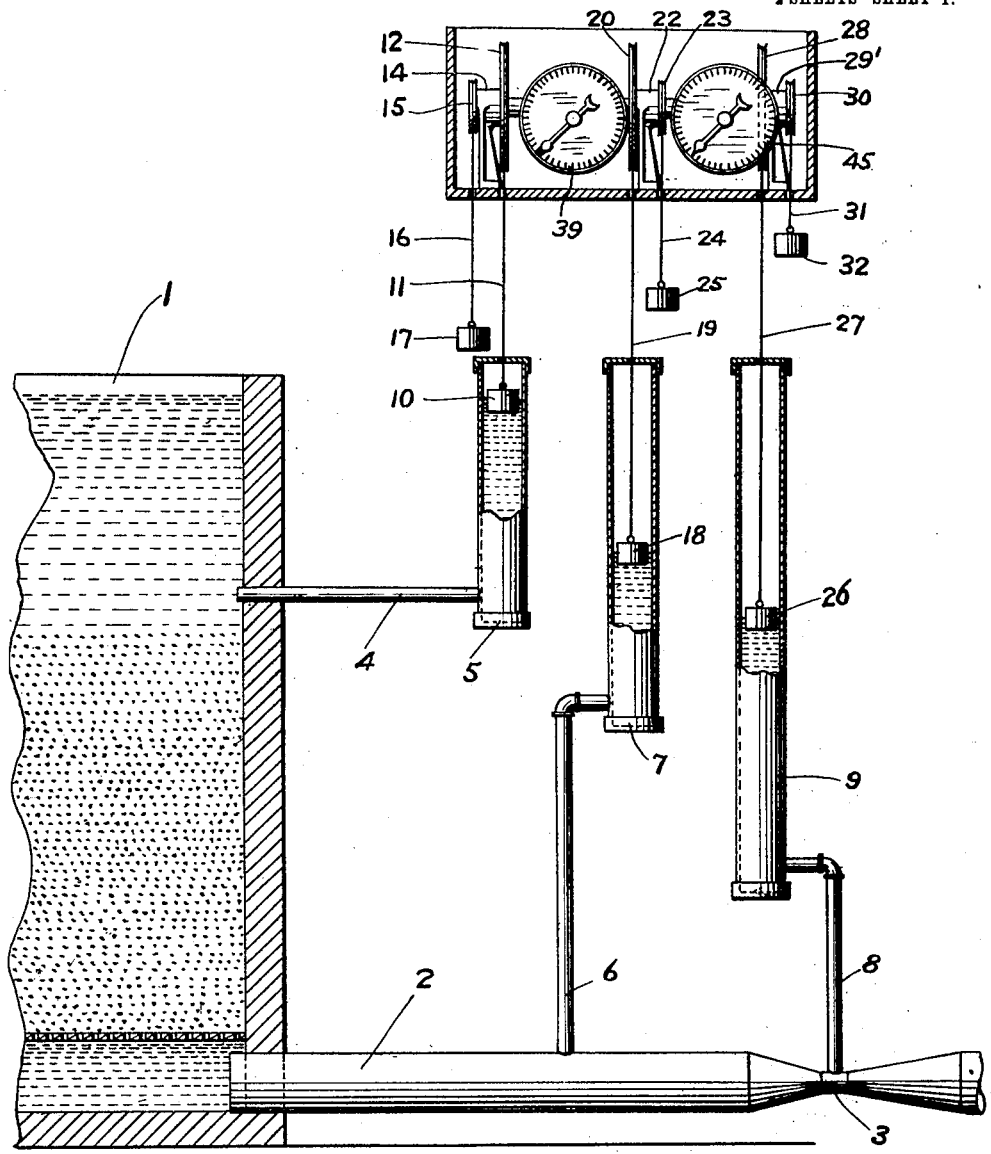
Figure 2:
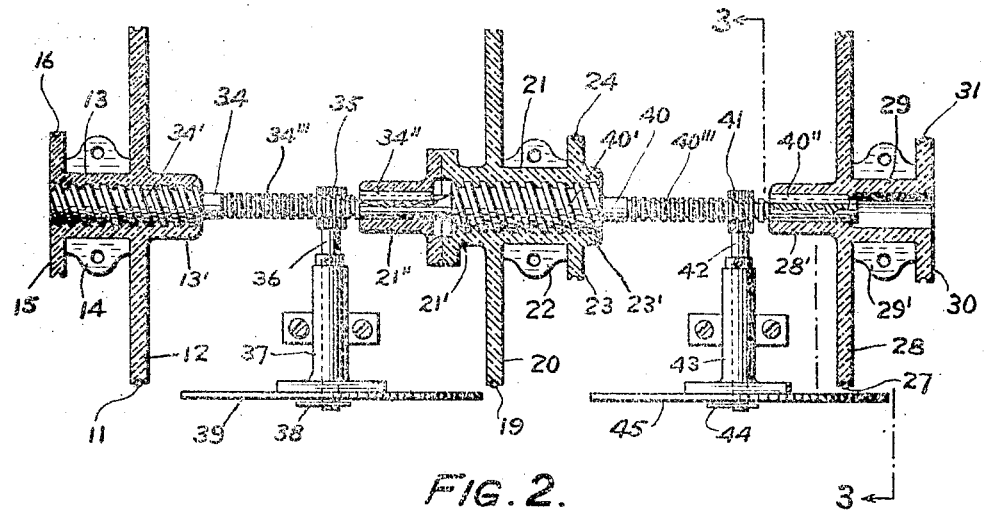
Figure 3:
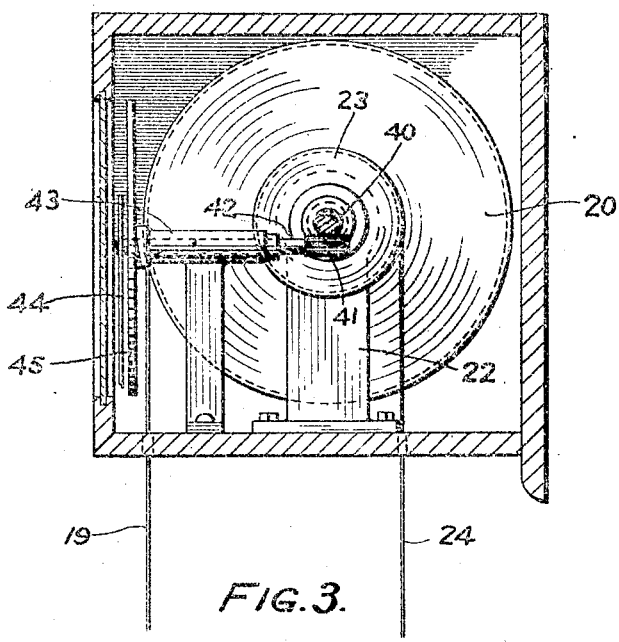

In the accompanying drawings, Figure 1 is a sectional elevation representing the invention, Fig. 2 is a sectional plan of the differential mechanisms, and Fig. 3 is a sectional elevation taken on the line 3—3 of Fig. 2.

As represented in the drawings, the invention is applied to the filter 1 discharging through the conduit 2 having the contracted section or throat 3.

A tube 4 connects the top of the filter with a tube or chamber 5 rising to or above the maximum piezometric head at the connection. A tube 6 connects a normal section of the effluent conduit with a tube or chamber 7 rising to or above the maximum piezometric head at its place of connection with the conduit, and a tube 8 connects the throat of the conduit with a tube or chamber 9 which rises to or above the maximum piezometric head at the throat.

A float 10, in the chamber 5, is connected by a cord or wire 11 with a sheave 12, which has the hollow journal 13 revoluble in the bearing 14, and a sheave 15 fixed to the journal is connected by a cord or wire 16 with a weight 17 which acts as a counter balance for the float.

A float 18, in the chamber 7, is connected by a cord or wire 19 with a sheave 20 fixed to a hollow journal 21 which is revoluble in the bearing 22 and a sheave 23 fixed to the journal is connected by a cord or wire 24 with a weight 25 to counter balance the float.

A float 26, in the chamber 9, is connected by a wire or cord 27 with a sheave 28 fixed to a hollow journal 29 which is revoluble in the bearing 29', and fixed to the journal is a second sheave 30 which is connected by a cord or wire 31 with a weight 32 for counter balancing the float.

The journal 13 and hub 13', connected with the sheaves 12 and 15, provide a barrel which is internally threaded to receive the end of a shaft 34 having the threads 34', the opposite end of the rod having the spline connection 34''' with the hub 21'' which is fixed to the sheave 20. The body of the shaft is provided with the cylindrical rack 34''' which engages a pinion 35 fixed to a shaft or journal 36, the latter being journaled in a bearing 37 and carrying a pointer 38 which moves over the graduated dial 39.

The journal 21, with the sheave hubs 21' and 23', provides a barrel which is internally threaded to receive the end of a shaft 40 having the threads 40', the opposite end of the shaft having the spline connection 40'' with the hub 28' of the sheave 28. A cylindrical rack 40''' on the body of this shaft engages a pinion 41 on a shaft 42 journaled in a bearing 43, the shaft carrying a pointer 44 which moves over a graduated dial 45.

The height of the column of liquid in the chamber 5, representing the head at the influx to the filter bed, determines the position of the float 10 and the sheave 12. The movement of these parts, which is induced by changes in head, is communicated through the screw 34' to move the shaft 34 longitudinally, whereby the pinion 35 and shaft 36 are revolved to move the pointer 38 on the dial 39. The height of the column of liquid in the chamber 7, representing the head of the efflux from the filter, determines the position of the float 18 and the sheave 20. Any variation in the column effects a rotary and longitudinal movement of the shaft 34 through its spline 34″ and screw 34′, whereby the pinion 35 and shaft 36 are revolved to move the pointer 38 over the dial 39.

As the variations in head shown by these piezometric columns are differentiated by the mechanisms subject thereto, the resultant pressure or head will be indicated by the pointer with the graduations on the dial. The loss of head, which results from the accumulation of foreign matter or other obstruction in the filter, may thus be indicated.

The height of the column of liquid in the chamber 7 and the consequent positions of the float 18 and the sheave 20 affect the position of the shaft 40 which is moved longitudinally by its screw 40′ through the rotary movement of the sheave. The longitudinal movement of this shaft revolves the pinion 41 and the shaft 42, whereby the pointer 44 is caused to move over the dial 45.

The height of the column of liquid in the chamber 9 and the consequent positions of the float 26 and sheave 28 also affect the position of the pointer 44, the rotary movement of the sheave being communicated by the spline 40″ to the shaft 40 which is thus moved longitudinally by the engagement of its screw 40′, whereby the pinion 41 and its shaft 42 are revolved to move the pointer 44 over the dial 45.

The variations in head, as shown by the piezometric columns of the chambers connected with a normal and the contracted section of the conduit, which variations increase with any increase in velocity of flow, are thus differentiated and by suitably graduating the dial the pointer will indicate the rate of flow thereon.

Having described my invention, I claim:—

1. In a liquid gage, an indicator, a journal for moving said indicator, mechanism comprising a revoluble and longitudinally movable shaft for operating said journal, and means movable by variations of liquid head for moving said shaft.

2. In a liquid gage, a piezometric chamber, a float in said chamber, a rotary device, means whereby said device is connected to and movable with said float, a shaft having a screw connection with said device, a second piezometric chamber, a float in said second chamber, a second rotary device, means whereby said device last named is connected to and movable with said second float, and a spline connection between said shaft and said second rotary device.

3. In a liquid gage, a piezometric chamber, a float in said chamber, a rotary and longitudinally movable shaft, means for balancing said float and communicating movement to said shaft, a second piezometric chamber, a float in said second chamber, means for balancing said last named float and communicating movement to said shaft, and means whereby movements of said shaft are indicated.

4. In a liquid gage, in combination with a filter, a chamber connected with the influx to the filter bed, a float in said chamber, a shaft, means for communicating movement from said float to said shaft, a chamber connected to the efflux from said filter bed, a float in said chamber last named, means for communicating movement from said float last named to said shaft, and means whereby movements of said shaft indicate variations in the piezometric columns of said chambers.

5. In a liquid gage, in combination with a filter and a conduit discharging therefrom, a piezometric chamber connected with the influx to the bed of said filter, a float in said chamber, indicating mechanism, means whereby said mechanism is connected with and movable by said float, a piezometric chamber connected with said conduit, a float in said chamber last named, means whereby said float last named is connected with and moves said indicating mechanism, a second indicating mechanism movable by means for moving said indicating mechanism first named, a second piezometric chamber connected with said conduit, a float in said chamber last named, and means whereby said last named float is connected with and moves said second indicating mechanism.

6. In a liquid gage, a conduit having a contracted section, a tube connected to a normal section of said conduit, a tube connected to said contracted section, and mechanisms movable with variations of the liquid columns in said tubes, said mechanisms comprising a longitudinally movable shaft and indicating means operated thereby.

7. In a liquid gage, means for holding a column of liquid, a shaft, means whereby variations in said column move said shaft longitudinally, means for holding a second column of liquid, and means whereby variations in said second column of liquid move said shaft longitudinally.

8. In a liquid gage, means for holding a column of liquid, a shaft, means whereby variations in said column of liquid move said shaft longitudinally, means for holding a second column of liquid, and means whereby variations in said second column of liquid move said shaft revolubly and longitudinally.

9. In a liquid gage, means containing a liquid column, a threaded barrel, means whereby variations in said column revolve said barrel, a shaft having a thread engaged by said barrel, means containing a second liquid column, a barrel having a spline connection with said shaft, an indicating mechanism, and means whereby movements of said shaft move said indicating mechanism.

10. In a liquid gage, a revoluble barrel, a shaft having a threaded connection with said barrel, means whereby said shaft is revolved, a rack on said shaft, a wheel engaged by said rack, a shaft revolved by said wheel, and an indicator operated by said shaft last named.

In testimony whereof I have hereunto set my name this 23 day of August, 1907, in the presence of the subscribing witnesses.

MORO M. BORDEN.

Witnesses:
    ROBERT JAMES EARLEY,
    C. N. BUTLER.